T. N. Bunnell,
Hay Stacker.
No. 95,879. Patented Oct. 19, 1869.
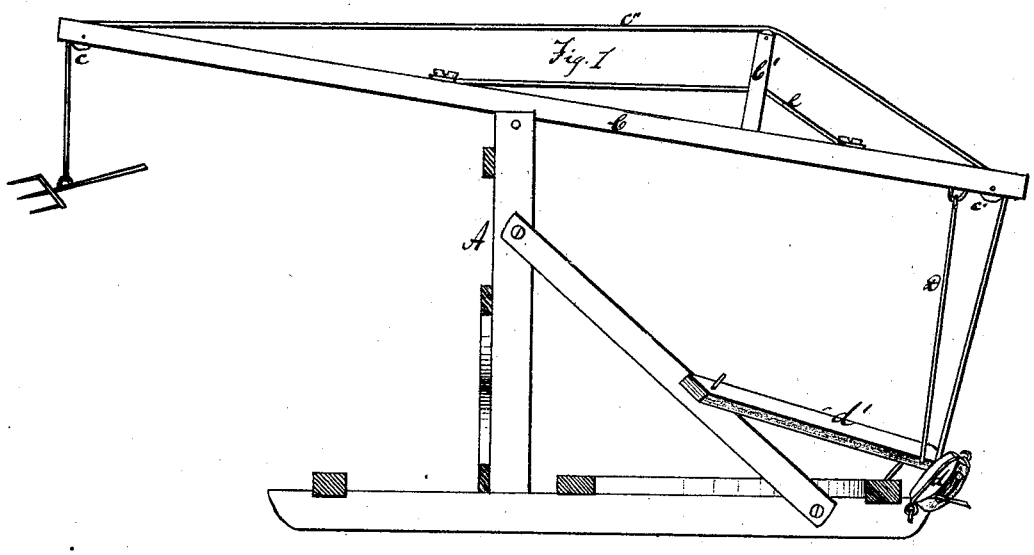
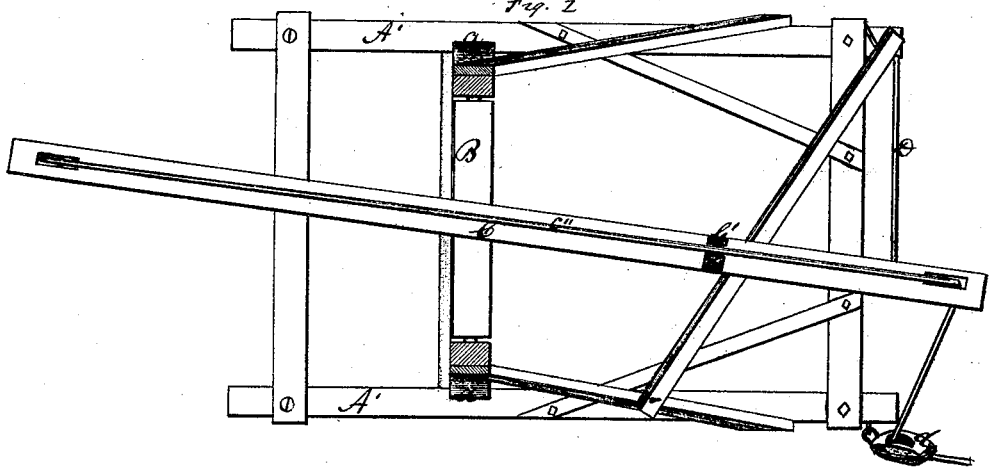
Witnesses.
C. D. Brown
C. S. Orton
T. N. Bunnell, Inventor
by Geo. E. Brown, Atty.

United States Patent Office.

T. N. BUNNELL, OF REYNOLDS, INDIANA.

Letters Patent No. 95,879, dated October 19, 1869.

IMPROVEMENT IN HAY-STACKERS.

The Schedule referred to in these Letters Patent and making part of the same.

*To all whom it may concern:*

Be it known that I, T. N. BUNNELL, of Reynolds, in the State of Indiana, have invented a new and useful Improvement in Hay-Stackers; and I do hereby declare that the following is a full, clear, and exact description of the same, reference being had to the accompanying drawings, and letters of reference marked thereon, making a part of this specification, in which—

Figure 1 is a side elevation, and

Figure 2, a plan view.

To enable those skilled in the art to make and use my invention, I now proceed to describe its construction and operation.

Similar letters in the drawings refer to like parts.

This invention consists of a vertical frame-work, mounted in a kind of sledge, suited for transportation, having a bar pivoted crosswise of its upper end, from which bar projects upward an iron bolt that forms the pivot, upon which a long lever may be moved from side to side, and that so connects the lever with the said pivoted bar as to make of the latter a fulcrum for the former in its vertical movements, said lever having sheaves at its ends, over which the hay-fork rope passes, and being movable both vertically and laterally so as to both raise hay from the field and swing it sidewise upon a stack; and being controlled in its lateral movements by a stay-rod, connected at one end with the rope that retains the lever at its but, and pivoted at the other end to the said vertical frame-work.

In the drawings—.

A is the frame-work, consisting mainly of a pair of vertical posts, *a a*, stepped each in a shoe, A', the two shoes being connected by cross-pieces, so as to form a sledge suitable for transportation.

The posts *a a* are so stayed and braced that the frame-work is made sufficiently strong.

Crosswise of the frame-work is a bar, B, having its ends pivoted in the tops of the posts *a*.

Upon the upper side of the bar B rests a long lever, C, a bolt connecting these two parts in such a manner that the lever may be vibrated up and down upon the bar as a fulcrum, and at the same time swung to and fro upon the bolt, as a pivot.

In the ends of the lever are sheaves, *c c'*, over which the hay-fork rope *c"* passes, proceeding from the latter sheave through the block *d*, fastened near one corner of the sledge. The rope *c"* extends thence to the horse.

The lever C has a short post, C', projecting from its upper side, in the top of which is a sheave, over which the rope *c"* runs, and through the post extends the iron brace *e* that stiffens the lever.

A rope, D, connects the but of the lever with one corner of the sledge, in order to check the lever from rising too high under the weight of the hay, and regulates the lateral motion of the lever.

A stay, *d'*, pivoted at one end to the brace of the vertical frame-work, slides at the other end upon the rope D, and in proportion as the said end of the stay is lower or higher upon the rope, the lateral play of the lever is greater or less.

When the hay-fork receives its load, the horse is started, and the fork raised vertically till it, or a stop on the rope, strikes the end of the lever. The latter is then carried along with the fork in a slanting direction, so as to swing the hay over the stack, where it is dropped.

On backing up the horse, the parts assume automatically their proper positions.

What I claim as new, and desire to secure by Letters Patent, is—

The frame-work A, combined with the pivoted bar B, the lever C, rope D, and stay *d'*, in the manner and for the purpose set forth.

T. N. BUNNELL.

Witnesses:
A. L. HURTT,
JOHN S. HURTT.